May 9, 1944.  G. E. BULLOCK  2,348,190
LIQUID PUMP
Filed Nov. 17, 1941
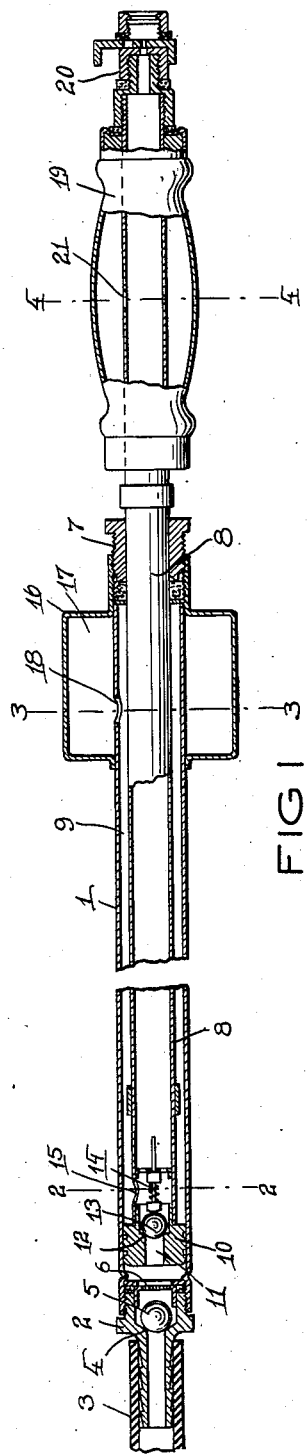
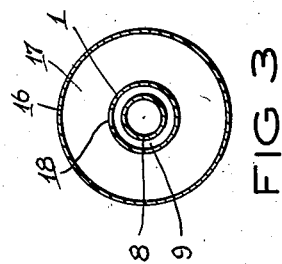
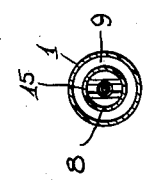
INVENTOR
GILES E. BULLOCK
BY
ATTORNEY Patented May 9, 1944

2,348,190

UNITED STATES PATENT OFFICE 2,348,190

LIQUID PUMP

Giles E. Bullock, Rochester, N. Y.

Application November 17, 1941, Serial No. 419,362

2 Claims. (Cl. 103—224)

This invention relates to hand operated liquid pumps attached to the end of a flexible hose for connection with a portable supply tank, and the object of the invention is to incorporate in such a pump a novel air chamber and arrange it relative to the outlet and inlet of the pump so that air is compressed in the air chamber on the operation of the pump in any position in which it may be operated to direct the stream in the desired direction.

This and other objects and attendant advantages of the invention will become more readily apparent from the detailed description thereof which follows, reference being had to the accompanying drawing in which Figure 1 is a longitudinal sectional view of the pump embodying my invention.

Figure 2 is a transverse sectional view taken on the line 2—2 in Figure 1.

Figure 3 is a transverse sectional view taken on the line 3—3 in Figure 1.

Figure 4 is a transverse sectional view taken on the line 4—4 in Figure 1.

Hand operated pumps of the type of the present invention have heretofore been used for spraying purposes and in such use the spray is mostly directed upwardly so that a centrally located syphon tube in the plunger of the pump is sufficient to trap enough air in the hollow plunger to cause its expansion to provide a substantially uninterrupted flow from the nozzle of the pump. However, when such a pump is directed downwardly, the liquid in the plunger displaces the air in the syphon tube and with it eliminates the force which provided the uninterrupted flow thereof under pressure during the operation of the pump.

In the present invention an uninterrupted flow of liquid under pressure from the hand pump is made possible by the use of an air chamber which is located on the outside of the pump and is arranged in such a manner relative to the inlet and outlet provided by the nozzle thereof that the air trapped therein cannot be displaced but is always compressed by the liquid in any position of the pump on the movement of the plunger of the pump.

As illustrated in the figures of the drawing, the pump comprises the cylinder 1 which carries at the intake end the nipple 2 for the attachment of a flexible hose 3. Within the nipple the valve seat 4, the ball 5 and the ball cage 6 provide a check valve which provides for the intake of liquid into the cylinder on the suction stroke of the pump.

The outer end of the cylinder 1 is closed by the gland packing nut 7 and a hollow plunger 8 is slidably mounted in this nut for partial movement in and out of the cylinder. The hollow plunger 8 is smaller in diameter than the cylinder in order to provide suitable clearance 9 between the outer wall of the plunger and the inner wall of the cylinder. At the inner end, the plunger 8 carries the plunger head 10 for sliding engagement in the cylinder 1 and closure of the clearance 9 between the plunger and the cylinder.

The plunger head 10 has a central inlet duct 11 surrounded by a valve seat 12 and a ball valve 13 is yieldingly held in place on this seat by the spring pressed stem 14 to normally hold the duct closed. The wall of the hollow plunger 8 is provided with the opening 15 near the plunger head so as to connect the clearance 9 surrounding the plunger with the inside thereof.

The cylinder 1 is surrounded by an enlarged cylindrical casing 16 and the air chamber 17 provided thereby is connected with the inside of the cylinder by means of the opening 18 in the wall thereof.

The hollow plunger 8 is surrounded on the outside of the cylinder by the handle 19 with which it is manually operated by partially sliding it trombone fashion in and out of the cylinder 1. A nozzle 20 is threaded to the end of the plunger to restrict the outlet and provide for the discharge of the liquid under the pressure created by the pump.

In the operation of the pump the first outward suction movement of the plunger causes liquid to enter thru the check valve in the end thereof and fill the cylinder behind the plunger head 10. The first return compression movement of the plunger closes the check valve of the cylinder and causes the liquid to be forced thru the check valve in the plunger head into the plunger proper and the clearance surrounding it to substantially fill the plunger and the space in the cylinder which surrounds it in front of the plunger head 10. Thereafter every successive suction stroke of the plunger forces part of the liquid trapped in the clearance 9 against the closed end of the cylinder and into the air chamber to compress the air therein while the remaining portion is displaced and forced into the hollow plunger thru the hole 15 to displace and force an equal amount thru the nozzle 20. Every compression stroke in turn continues to force liquid from the plunger and exerts pressure on the liquid in the clearance surrounding the plunger to compress the air or keep it compressed in the air chamber, so that during the reversal in the movements of the plunger the compressed air in the air chamber may expand and continue to force the liquid from the nozzle. In this way the stream from the nozzle will not be interrupted by the momentary inactiveness of the plunger at the beginning and end of each of its movements.

It will be noted that the location of the air chamber on the cylinder is such that no matter whether the pump is pointed up or down, the air in the air chamber cannot be displaced therefrom by the liquid forced into and out of the clearance surrounding the plunger in the cylinder. The air in the air chamber on its compression thus serves to produce an uninterrupted stream on the reciprocating movement of the plunger in any position of the cylinder.

To supplement the action of the air chamber 17, the handle 19 may be hollow and connected with the inside of the plunger 8 by means of the hole 21 in the wall thereof. Air in the hollow handle is then compressed when the liquid is forced from the nozzle under pressure and expansion of the air in the handle will continue to force the liquid from the nozzle during the period the movement of the plunger has partially or entirely reduced its force against the liquid.

I claim:

1. In a hand liquid pump the combination of a cylinder, a hollow plunger mounted to reciprocate in said cylinder with clearance between it and the plunger and a perforated wall in the plunger for connection of the space within and without the plunger at the inner end thereof, a plunger head on said plunger, a check valve carried by said plunger and arranged to provide an inlet into the space within and without the plunger, an air chamber on the outside of said cylinder, a duct connecting the inside of said cylinder with said air chamber to provide for the compression of air in said chamber by the liquid forced into the space between the plunger and the cylinder on the movement of said plunger, and a nozzle at the outer end of said plunger to provide a restricted outlet from the plunger and effect a substantially uninterrupted discharge of the liquid under pressure by the movement of the plunger and the expansion of the air in said air chamber on the reversal of the movement of the plunger.

2. In a hand liquid pump the combination of a cylinder, a hollow plunger mounted to reciprocate in said cylinder with clearance between it and said plunger and a perforated wall for connection of the space within and without the plunger, a plunger head on said plunger, a check valve carried by said plunger arranged to provide an inlet into the space within and without said plunger, an enlarged cylindrical casing surrounding said cylinder and connected with the inside of the cylinder by a duct to provide an air chamber for said cylinder for the compression of air on the suction stroke of said plunger out of said cylinder, and a nozzle on the end of said plunger so as to restrict the passage of the liquid from the plunger and cause compression of air by the liquid in said air chamber on the compression stroke of said plunger in its movement into said cylinder in any angular position of said cylinder.

GILES E. BULLOCK.